US012259970B1

(12) United States Patent
Silva et al.

(10) Patent No.: US 12,259,970 B1
(45) Date of Patent: Mar. 25, 2025

(54) SYSTEMS AND METHODS FOR IDENTIFYING SECURITY THREATS IN SMART CONTRACT-BASED SERVICES TO PROTECT AGAINST MALICIOUS ATTACKS UTILIZING OFF-BLOCKCHAIN RESOURCES

(71) Applicant: GEN DIGITAL INC., Tempe, AZ (US)

(72) Inventors: David Luz Silva, Dublin (IE); Iskander Sanchez Rola, Antibes (FR)

(73) Assignee: GEN DIGITAL INC., Tempe, AZ (US)

( * ) Notice: Subject to any disclaimer, the term of this patent is extended or adjusted under 35 U.S.C. 154(b) by 311 days.

(21) Appl. No.: 17/656,042

(22) Filed: Mar. 23, 2022

(51) Int. Cl.
G06F 21/55 (2013.01)

(52) U.S. Cl.
CPC ...... G06F 21/554 (2013.01); *G06F 2221/034* (2013.01)

(58) Field of Classification Search
CPC .................. G06F 21/554; G06F 2221/034
See application file for complete search history.

(56) References Cited

U.S. PATENT DOCUMENTS

| | | | | |
|---|---|---|---|---|
| 10,797,860 | B1 * | 10/2020 | Dennis | H04L 9/14 |
| 11,645,650 | B1 * | 5/2023 | Singh | G06Q 20/3674 705/75 |
| 2019/0273739 | A1 * | 9/2019 | Pemmaraju | H04L 63/0884 |
| 2020/0050768 | A1 * | 2/2020 | Ragnoli | G06F 21/563 |
| 2020/0082359 | A1 * | 3/2020 | Xu | G06Q 20/065 |
| 2020/0177372 | A1 * | 6/2020 | Bhamidipati | H04L 9/50 |
| 2020/0201838 | A1 * | 6/2020 | Ciocarlie | G06F 21/577 |
| 2020/0372154 | A1 * | 11/2020 | Bacher | H04L 63/1408 |
| 2021/0014065 | A1 * | 1/2021 | Gourisetti | H04L 9/0637 |
| 2021/0037055 | A1 * | 2/2021 | Dumont | G06Q 30/0207 |

(Continued)

FOREIGN PATENT DOCUMENTS

| | | | | |
|---|---|---|---|---|
| CN | 108874802 | A | * 11/2018 | |
| CN | 113919841 | A | * 1/2022 | |
| CN | 111429145 | B | * 4/2022 | G06Q 20/4016 |
| CN | 113190330 | B | * 6/2022 | G06F 16/27 |

OTHER PUBLICATIONS

Praitheeshan et al., "Security Analysis Methods on Ethereum Smart Contract Vulnerabilities—A Survey", URL: https://arxiv.org/pdf/1908.08605.pdf, Sep. 16, 2020, pp. 1-21.

(Continued)

*Primary Examiner* — Darshan I Dhruv
(74) *Attorney, Agent, or Firm* — Greenberg Traurig, LLP

(57) ABSTRACT

The disclosed computer-implemented method for identifying security threats in smart contract-based services to protect against malicious attacks utilizing off-blockchain resources may include (i) identifying a reference associated with a transaction on a smart contract-based platform, (ii) detecting content describing one or more smart contracts associated with the reference on the platform, (iii) extracting an identifier from the content to locate off-blockchain resources utilized by the smart contracts, (iv) determining potential security threats associated with the off-blockchain resources, and (v) performing a security action that protects against the potential security threats. Various other methods, systems, and computer-readable media are also disclosed.

18 Claims, 7 Drawing Sheets

(56) References Cited

U.S. PATENT DOCUMENTS

| | | | |
|---|---|---|---|
| 2021/0049281 A1* | 2/2021 | Braghin | G06F 21/577 |
| 2021/0067339 A1* | 3/2021 | Schiatti | G06F 16/27 |
| 2021/0110047 A1* | 4/2021 | Fang | G06N 20/00 |
| 2021/0304311 A1* | 9/2021 | Banescu | G06Q 40/06 |
| 2021/0334363 A1* | 10/2021 | Kim | G06F 21/54 |
| 2021/0352139 A1* | 11/2021 | Madisetti | H04L 9/50 |
| 2021/0365555 A1* | 11/2021 | Nissan | G06F 9/30181 |
| 2022/0050887 A1* | 2/2022 | Han | H04L 9/3239 |
| 2022/0253813 A1* | 8/2022 | Pospieszalski | H04L 9/50 |
| 2022/0309491 A1* | 9/2022 | Shapiro | G06F 21/64 |
| 2023/0065259 A1* | 3/2023 | Chen | G06F 21/554 |

OTHER PUBLICATIONS

Samreen et al., "A Survey of Security Vulnerabilities in Ethereum Smart Contracts", URL: https://arxiv.org/pdf/2105.06974.pdf, Nov. 10-13, 2020, pp. 1-10.

Eskandari et al., "SoK: Oracles from the Ground Truth to Market Manipulation", URL: https://arxiv.org/pdf/2106.00667.pdf, Sep. 26-28, 2021, 14 pages.

Tjiam et al., "Your Smart Contracts Are Not Secure: Investigating Arbitrageurs and Oracle Manipulators in Ethereum", Paper Session 2, CYSARM, Virtual Event, Nov. 19, 2021, pp. 25-35.

Breidenbach et al., "Chainlink 2.0: Next Steps in the Evolution of Decentralized Oracle Networks", URL: https://research.chain.link/whitepaper-v2.pdf, Apr. 15, 2021, pp. 1-136.

"ETH PayNow Button", URL: https://medium.com/@enslisting.com/eth-paynow-button-996405998c8b, Nov. 25, 2017, 12 pages.

"How to create your own Oracle with an Ethereum smart contract", URL: https://www.quicknode.com/guides/solidity/how-to-create-your-own-oracle-with-an-ethereum-smart-contract, Dec. 27, 2021, 5 pages.

"What is an Ethereum Address", URL: https://info.etherscan.com/what-is-an-ethereum-address/, Etherscan, retreived on Apr. 8, 2022, 3 pages.

\* cited by examiner

SYSTEMS AND METHODS FOR IDENTIFYING SECURITY THREATS IN SMART CONTRACT-BASED SERVICES TO PROTECT AGAINST MALICIOUS ATTACKS UTILIZING OFF-BLOCKCHAIN RESOURCES

BACKGROUND

Online services are increasingly utilizing smart contract-based systems running on public blockchains for conducting a variety of transactions such as the making of payments, tracking and trading assets, performing identity/reputation functions, generating non-deterministic random numbers utilized in lottery and gaming activities, etc.). Many of these transactions may often be completed utilizing "oracles" (i.e., a third-party service that connects smart contracts with external blockchain resources).

As the external blockchain resources contacted by oracles are typically publicly available data sources, they may often be at risk of web service attacks. Consequently, the underlying platforms (i.e., smart contact-based platforms such as the Ethereum blockchain) that rely on the data provided by oracles as well as the users of online services relying on these platforms, may also be at risk of these attacks.

SUMMARY

As will be described in greater detail below, the present disclosure describes various systems and methods for identifying security threats in smart contract-based services to protect against malicious attacks utilizing off-blockchain resources.

In one example, a method for identifying security threats in smart contract-based services to protect against malicious attacks utilizing off-blockchain resources may include (i) identifying, by the one or more computing devices, a reference associated with a transaction on a smart contract-based platform, (ii) detecting, by the one or more computing devices, content describing one or more smart contracts associated with the reference on the platform, (iii) extracting, by the one or more computing devices, an identifier from the content to locate off-blockchain resources utilized by the smart contracts, (iv) determining, by the one or more computing devices, potential security threats associated with the off-blockchain resources, and (v) performing, by the one or more computing devices, a security action that protects against the potential security threats.

In some examples, the reference associated with the transaction on the smart contract-based platform may be identified by (i) detecting a blockchain transaction on the platform, (ii) identifying a transaction destination associated with the blockchain transaction, and (iii) resolving the transaction destination into a blockchain address. In some embodiments, the content describing the one or more smart contracts associated with the reference on the platform may be detected by identifying smart contract source code associated with the reference on the platform.

In some examples, the identifier may be extracted from the content to locate the off-blockchain resources by (i) parsing smart contract source code to identify an address utilized by smart contract oracle to contact a domain associated with the off-blockchain resources, (ii) mapping the address to a domain contacted by the smart contract oracle, and (iii) extracting the domain. Alternatively, identifier may be extracted from the content to locate the off-blockchain resources by (i) parsing smart contract source code to identify a domain associated with the off-blockchain resources that is contacted by the smart contracts and (ii) extracting the domain.

In some embodiments, the potential security threats associated with the off-blockchain resources may be determined by performing an evaluation to identify the potential security threats based on at least one domain associated with the off-blockchain resources. In some examples, the evaluation may include evaluating one or more of (i) a reputation database for historical data associated with the domain, (ii) a web stack for implementing a website associated with the domain to identify at least one of previously known security vulnerabilities and data leakages, (iii) certificate registration data associated with the domain, or (iv) a domain name registry service to access domain name registration data for the domain. In some embodiments, the evaluation may additionally include calculating a risk score.

In some examples, the security action may include generating a notification identifying the potential security threats associated with the off-blockchain resources. In one embodiment, the notification may include a risk assessment based on one or more security vulnerabilities determined for an off-blockchain resource domain utilized by the smart contracts.

In one embodiment, a system for identifying security threats in smart contract-based services to protect against malicious attacks utilizing off-blockchain resources may include at least one physical processor and physical memory comprising computer-executable instructions and one or more modules that, when executed by the physical processor, cause the physical processor to (i) identify, by an identification module, a reference associated with a transaction on a smart contract-based platform, (ii) detect, by a detection module, content describing one or more smart contracts associated with the reference on the platform, (iii) extract, by an extraction module, an identifier from the content to locate off-blockchain resources utilized by the smart contracts, (iv) determine, by a determining module, potential security threats associated with the off-blockchain resources, and (v) perform, by a security module, a security action that protects against the potential security threats.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a reference associated with a transaction on a smart contract-based platform, (ii) detect content describing one or more smart contracts associated with the reference on the platform, (iii) extract an identifier from the content to locate off-blockchain resources utilized by the smart contracts, (iv) determine potential security threats associated with the off-blockchain resources, and (v) perform a security action that protects against the potential security threats.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the present disclosure.

Figure 1:
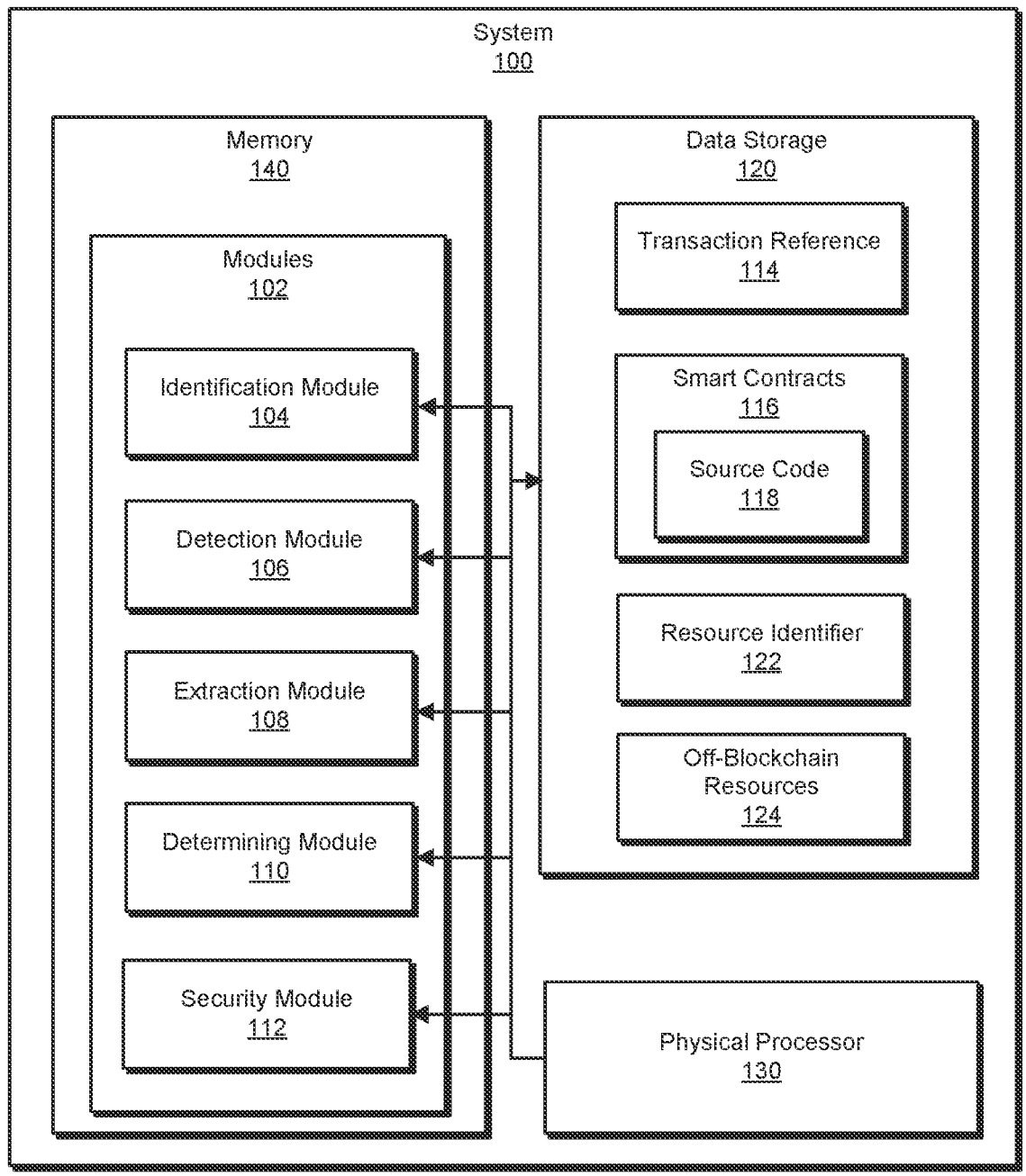
FIG. 1 is a block diagram of an example system for identifying security threats in smart contract-based services to protect against malicious attacks utilizing off-blockchain resources.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for identifying security threats in smart contract-based services to protect against malicious attacks utilizing off-blockchain resources. As will be explained in greater detail below, by analyzing a security posture of external blockchain resources contacted by a smart contract-based platform (e.g., an Ethereum blockchain platform), the systems and methods described herein may identify risky smart contract-based services by extracting oracle information (i.e., third-party services that connect smart contracts with the external blockchain resources) and/or their associated network domains to perform a security evaluation of these domains and determine a risk score for alerting users of potential threats associated with utilizing external blockchain resources for performing various smart contract-based transactions (e.g., financial transactions, identity/reputation transactions, random number generation for gaming transactions, etc.). In addition, the systems and methods described herein may improve the field of computing device security by protecting users against engaging in blockchain transactions involving malicious external entities seeking to exploit smart contracts as a primary attack vector against users of smart contract-based platforms.

Figure 2:
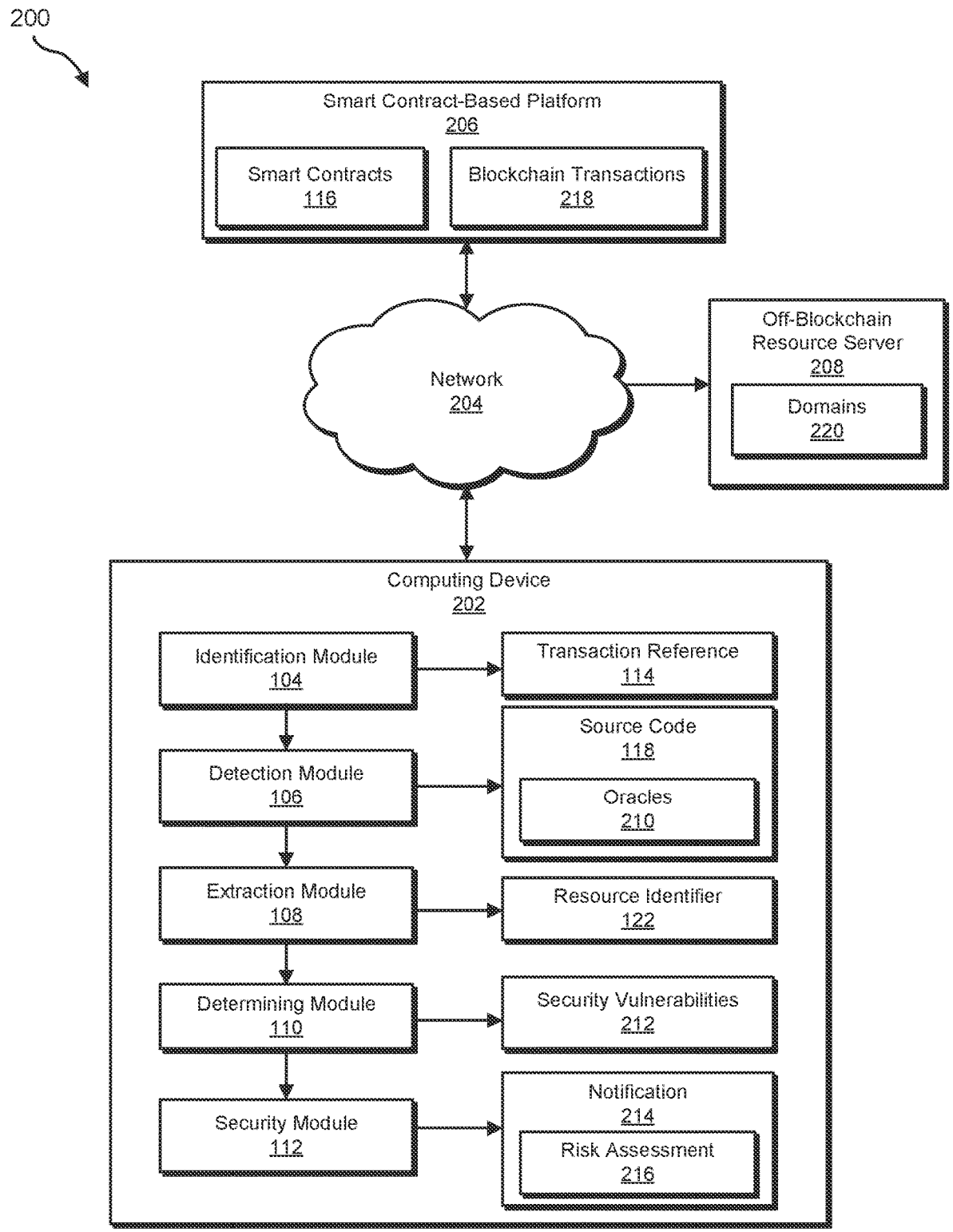
FIG. 2 is a block diagram of an additional example system for identifying security threats in smart contract-based services to protect against malicious attacks utilizing off-blockchain resources.
Figure 3:
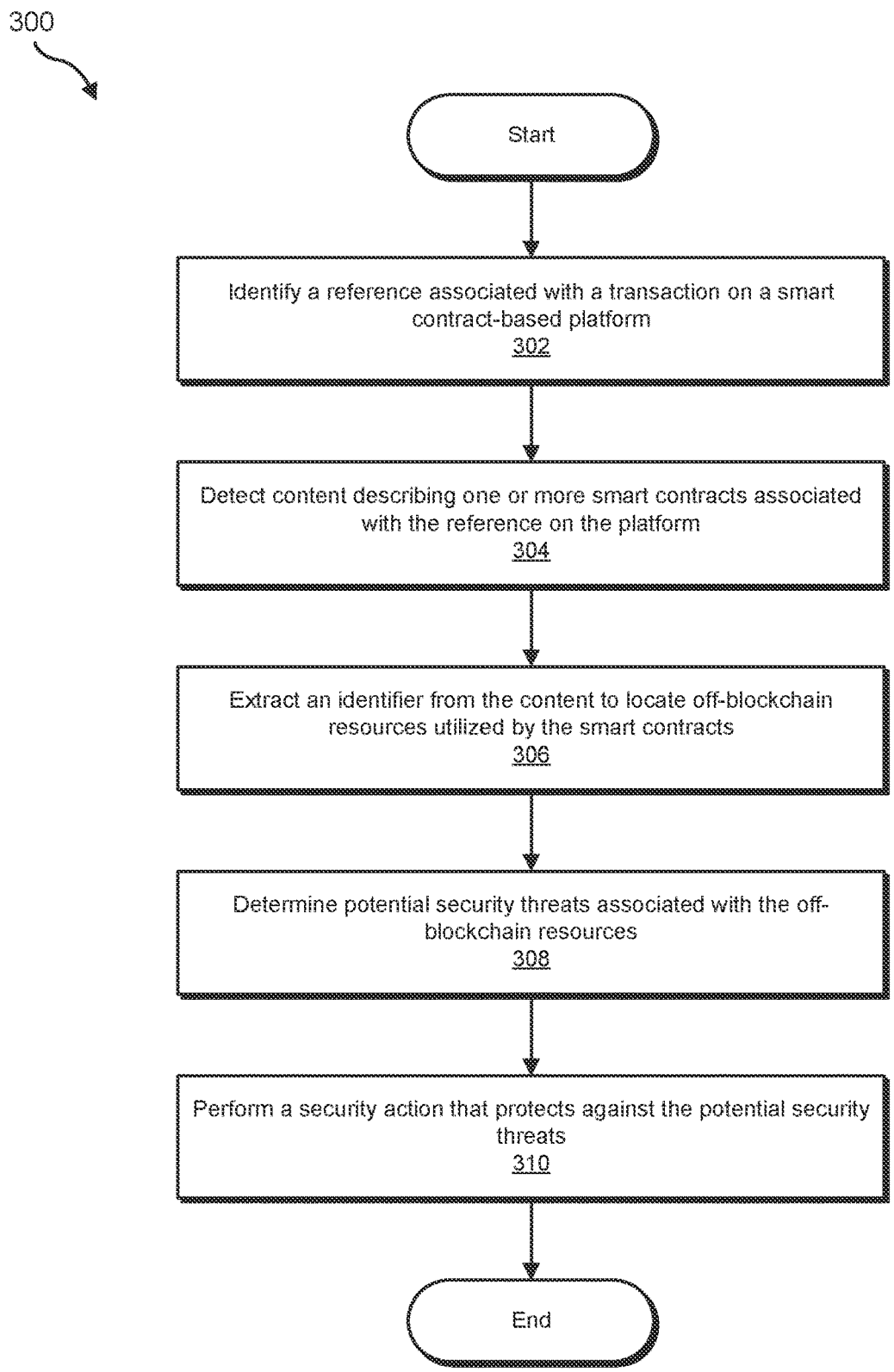
FIG. 3 is a flow diagram of an example method for identifying security threats in smart contract-based services to protect against malicious attacks utilizing off-blockchain resources.
Figure 4:
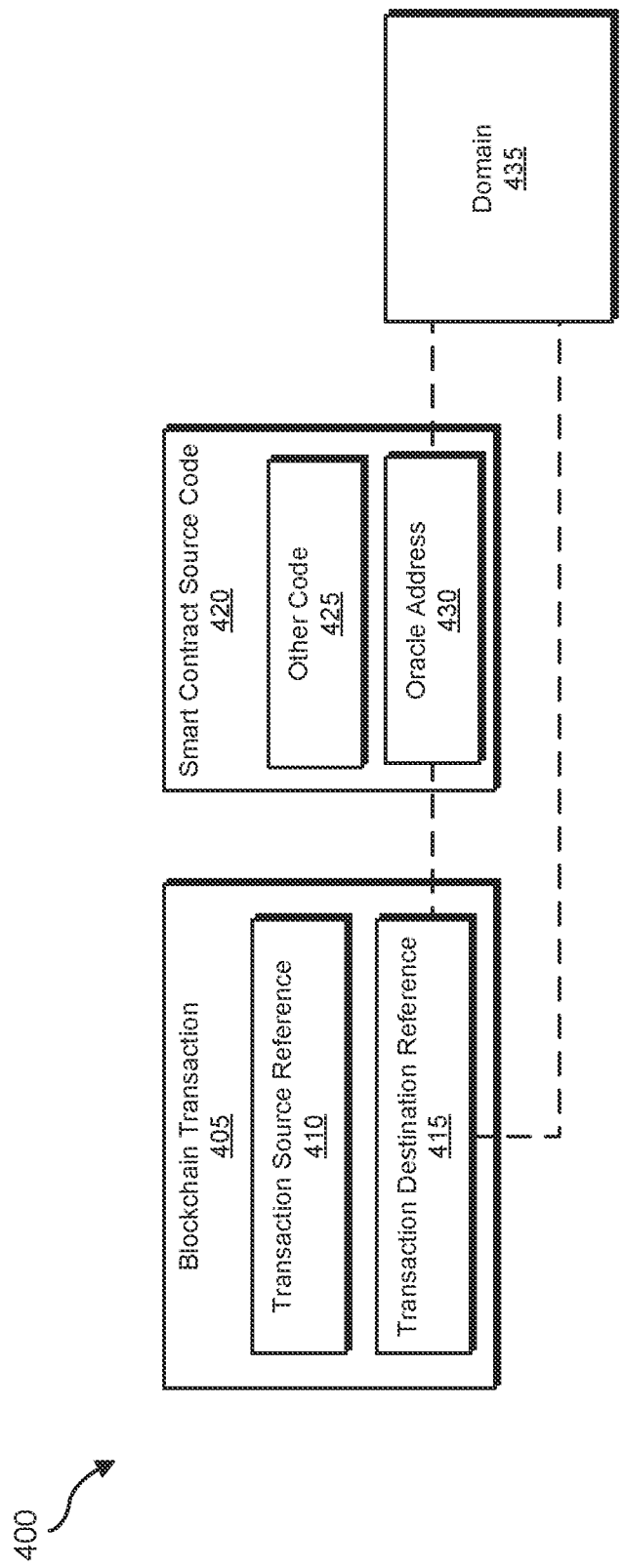
FIG. 4 is a block diagram of another example system for identifying security threats in smart contract-based services to protect against malicious attacks utilizing off-blockchain resources.

The following will provide, with reference to FIGS. 1-2, and 4, detailed descriptions of example systems for identifying security threats in smart contract-based services to protect against malicious attacks utilizing off-blockchain resources. Detailed descriptions of corresponding computer-implemented methods will also be provided in connection with FIGS. 3 and 5. In addition, detailed descriptions of an example computing system and network architecture capable of implementing one or more of the embodiments described herein will be provided in connection with FIGS. 6 and 7, respectively.

FIG. 1 is a block diagram of an example system 100 for identifying security threats in smart contract-based services to protect against malicious attacks utilizing off-blockchain resources. As illustrated in this figure, example system 100 may include one or more modules 102 for performing one or more tasks. For example, and as will be explained in greater detail below, example system 100 may include an identification module that identifies a transaction reference 114 associated with a transaction on a smart contract-based platform. Example system 100 may additionally include a detection module 106 that detects content (i.e., source code 118) describing one or more smart contracts 116 associated with transaction reference 114 on the platform. Example system 100 may also include an extraction module 108 that extracts a resource identifier 122 from the content to locate off-blockchain resources 124 utilized by smart contracts 116. Example system 100 may additionally include a determining module 110 that determines potential security threats associated with off-blockchain resources 124. Example system 100 may also include a security module 112 that performs a security action that protects against the potential security threats. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying security threats in smart contract-based services to protect against malicious attacks utilizing off-blockchain resources. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store transaction reference 114, smart contracts 116 (including source code 118), resource identifier 122, and off-blockchain resources 124.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a smart contract-based platform 206 and an off-blockchain resource server 208 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to identify security threats in smart contract-based services to protect against malicious attacks utilizing off-blockchain resources.

For example, identification module 104 may identify a transaction reference 114 associated with a blockchain transaction 218 on smart contract-based platform 206. Next, detection module 106 may detect source code 118 (which may include one or more oracles 210) describing one or more smart contracts 116 on smart contract-based platform 206 that are associated with transaction reference 114. Then, extraction module 108 may extract resource identifier 122 (e.g., a URL for a domain 220) from source code 118 to locate off-blockchain resources 124 (e.g., domains 220) on off-blockchain resource server 208. Then, determining module 110 may determine security vulnerabilities 212 associated with off-blockchain resources 124. Finally, security module 112 may perform a security action that protects against security vulnerabilities 212 by generating a notification 214 including a risk assessment 216 for utilizing off-blockchain resources 124 in smart contract-based transactions.

Computing device 202 generally represents any type or form of computing device capable of reading computer-executable instructions. In some examples, computing device 202 may be an endpoint device running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Smart contract-based platform 206 generally represents any type or form of computing device that is capable of capable of reading and/or executing computer-executable instructions. In some examples, smart-contract-based platform 206 may be an e-commerce server for executing blockchain transactions. Additional examples of smart contract-based platform 206 include, without limitation, security servers, application servers, web servers, storage servers, and/or database servers configured to run certain software applications and/or provide various security, web, storage, and/or database services. Although illustrated as a single entity in FIG. 2, smart contract-based platform 206 may include and/or represent a plurality of servers that work and/or operate in conjunction with one another.

Off-blockchain resource server 208 generally represents any type or form of computing device that is capable of capable of reading and/or executing computer-executable instructions. In some examples, smart-contract-based platform 206 may be an application server for servicing smart-contract based blockchain transactions. Additional examples of off-blockchain resource server 208 include, without limitation, security servers, web servers, storage servers, and/or database servers configured to run certain software applications and/or provide various security, web, storage, and/or database services. Although illustrated as a single entity in FIG. 2, off-blockchain resource server 208 may include and/or represent a plurality of servers that work and/or operate in conjunction with one another.

Network 204 generally represents any medium or architecture capable of facilitating communication or data transfer. In one example, network 204 may facilitate communication between computing device 202, smart contract-based platform 206, and off-blockchain resource server 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for identifying security threats in smart contract-based services to protect against malicious attacks utilizing off-blockchain resources. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a reference associated with a transaction on a smart contract-based platform. For example, identification module 104 may, as part of computing device 202 in FIG. 2, identify transaction reference 114 associated with a blockchain transaction 218 on smart contract-based platform 206. In some examples, transaction reference 114 may be an Ethereum address for a recipient of a blockchain transaction (e.g., a payment/transaction service) and smart contract-based platform 206 may be an Ethereum blockchain server.

Identification module 104 may identify transaction reference 114 in a variety of ways. In some examples, identification module 104 may detect a blockchain transaction 218 on platform 206. Next, identification module 104 may then identify a transaction destination associated with a blockchain transaction 218. Then, identification module 104 may resolve the transaction destination into a blockchain address.

At step 304, one or more of the systems described herein may detect content describing one or more smart contracts associated with the reference on the platform. For example, detection module 106 may, as part of computing device 202 in FIG. 2, detect source code 118 describing a smart contract 116 content associated with transaction reference 114 on platform 206.

At step 306, one or more of the systems described herein may extract an identifier from the content to locate off-blockchain resources utilized by the smart contracts. For example, extraction module 108 may, as part of computing device 202 in FIG. 2, extract resource identifier 122 from source code 118.

Extraction module 108 may extract resource identifier 122 in a variety of ways. In some examples, extraction module 108 may parse source code 118 to identify an address utilized by an oracle 210 to contact a domain 220 associated with off-blockchain resources 124. Next, extraction module 108 may map the oracle address to a domain 220 contacted by an oracle 210. Then, extraction module 108 may extract a domain 220. In alternative examples, extraction module 108 may parse source code 118 to identify a domain 220 associated with off-blockchain resources 124 contacted by a smart contract 116 and then extract a domain 220.

For example, FIG. 4 shows a system 400 including a blockchain transaction 405. In some embodiments, blockchain transaction 405 may include a transaction source reference 410 and a transaction destination reference 415. In some embodiments, transaction destination reference 415 may contact domain 435 utilizing an oracle address 430 (contained, along with other code 425, within smart contract source code 420). In an alternative embodiment, transaction destination reference 415 may directly contact domain 435.

Returning now to FIG. 3, at step 308, one or more of the systems described herein may determine potential security threats associated with the off-blockchain resources. For example, determining module 110 may, as part of computing device 202 in FIG. 2, determine security vulnerabilities 212 associated with the off-blockchain resources 124.

Figure 5:
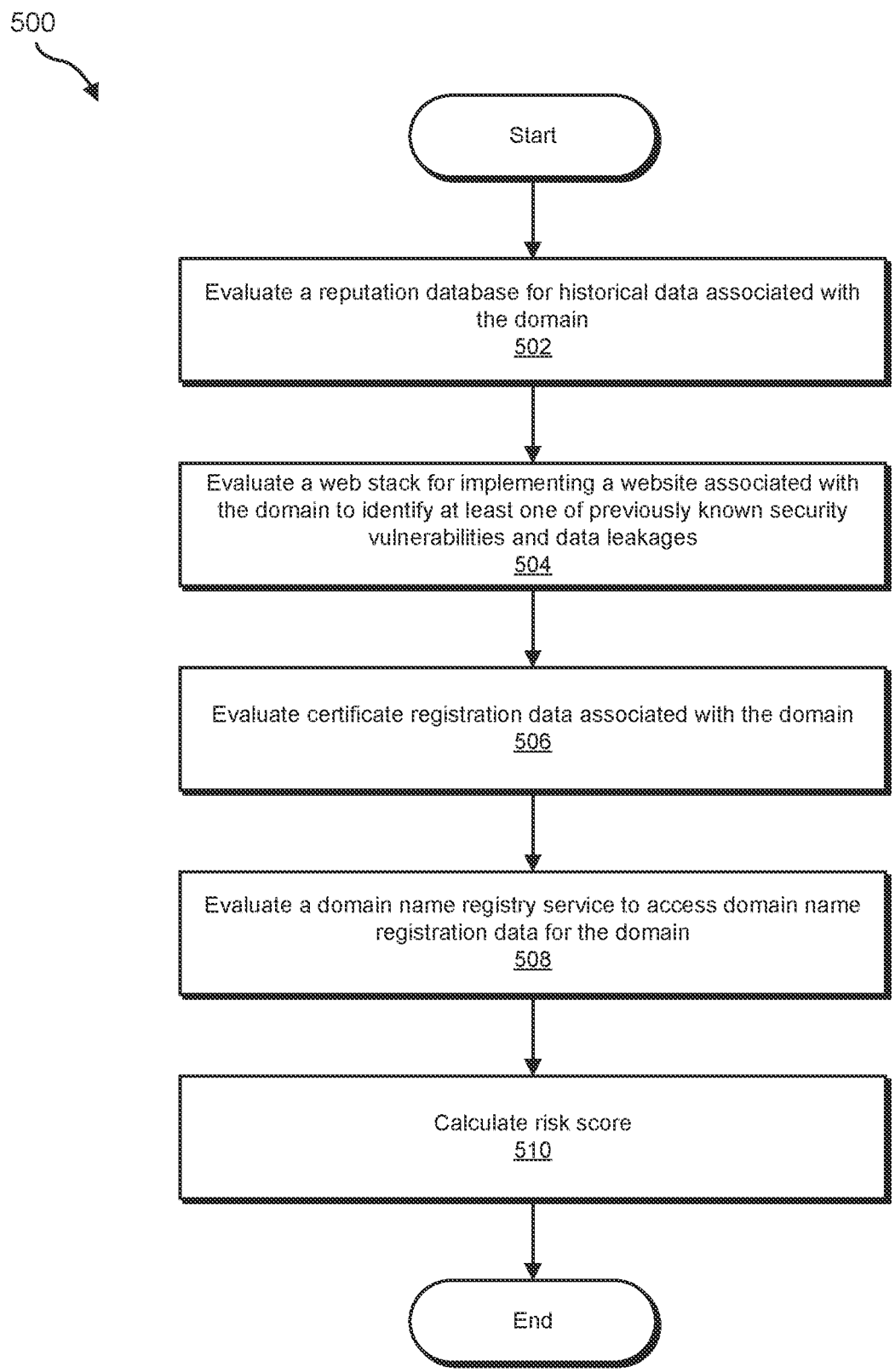
FIG. 5 is a flow diagram of an example method for determining security vulnerabilities associated with off-blockchain resources.

Determining module 110 may determine security vulnerabilities in a variety of ways which will now be described with respect to FIG. 5. Turning now to FIG. 5, a flow diagram of an example computer-implemented method 500 for determining security vulnerabilities associated with off-blockchain resources, will now be described. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502 one or more of the systems described herein may evaluate a reputation database for historical data associated with a domain associated with off-blockchain resources. For example, determining module 110 may, as part of computing device 202 in FIG. 2, evaluate a reputation data for historical information and features extracted from a behavior of off-blockchain resource server 208 that hosts a domain 220.

At step 504, one or more of the systems described herein may evaluate a web stack for implementing a website associated with the domain to identify at least one of previously known security vulnerabilities and data leakages. For example, determining module 110 may, as part of computing device 202 in FIG. 2, map an implemented web stack (e.g., tech, versions, available patches) with known security vulnerabilities or information leakages associated with a domain 220.

At step 506, one or more of the systems described herein may evaluate certificate registration data associated with the domain. For example, determining module 110 may, as part of computing device 202 in FIG. 2, check certificate registration data to validate a domain 220.

At step 508, one or more of the systems described herein may evaluate a domain name registry service to access domain name registration data for the domain. For example, determining module 110 may, as part of computing device 202 in FIG. 2, may utilize a communications protocol (such as the Registration Data Access Protocol (RDAP) to lookup domain name registration data for a domain 220.

At step 510, one or more of the systems described herein may calculate a risk score based on the evaluation performed at one or more of steps 502-508. For example, determining module 110 may, as part of computing device 202 in FIG. 2, gather the results of one or more of steps 502-508 and generate a risk score based thereon.

Returning now to FIG. 3, at step 310, one or more of the systems described herein may perform a security action that protects against the potential security threats. For example, security module 112 may, as part of computing device 202 in FIG. 2, perform a security action that protects against security vulnerabilities 212.

Security module 112 may perform the security action in a variety of ways. In some examples, security module 112 may generate notification 214 identifying security vulnerabilities 212 as determined by determining module 110. In some embodiments, notification 214 may be generated by a web browser plugin to alert users of smart contract-based platform 206 prior to conducting a blockchain transaction 218. In one embodiment, notification 214 may include risk assessment 216 associated with a domain 220 on off-blockchain server 208 utilized by a smart contract 116 on smart contract-based platform 206. For example, risk assessment 216 may include the risk score calculated at step 510 of FIG. 5 with a high score indicating an increased risk of a malicious attack against a user of smart-contract-based platform 206.

As explained above in connection with example method 300 in FIG. 3, the systems and methods described may be utilized to identify security threats in smart contract-based services to protect against malicious attacks utilizing off-blockchain resources. The systems and methods described herein may analyze a security posture of external blockchain resources contacted by a smart contract-based platform (e.g., an Ethereum blockchain platform). The systems and methods described herein may further identify risky smart contract-based services by extracting oracle information (i.e., third-party services that connect smart contracts with the external blockchain resources) and/or their associated network domains to perform a security evaluation of these domains and determine a risk score for alerting users of potential threats associated with utilizing external blockchain resources for performing various smart contract-based transactions (e.g., financial transactions, identity/reputation transactions, random number generation for gaming transactions, etc.).

Figure 6:
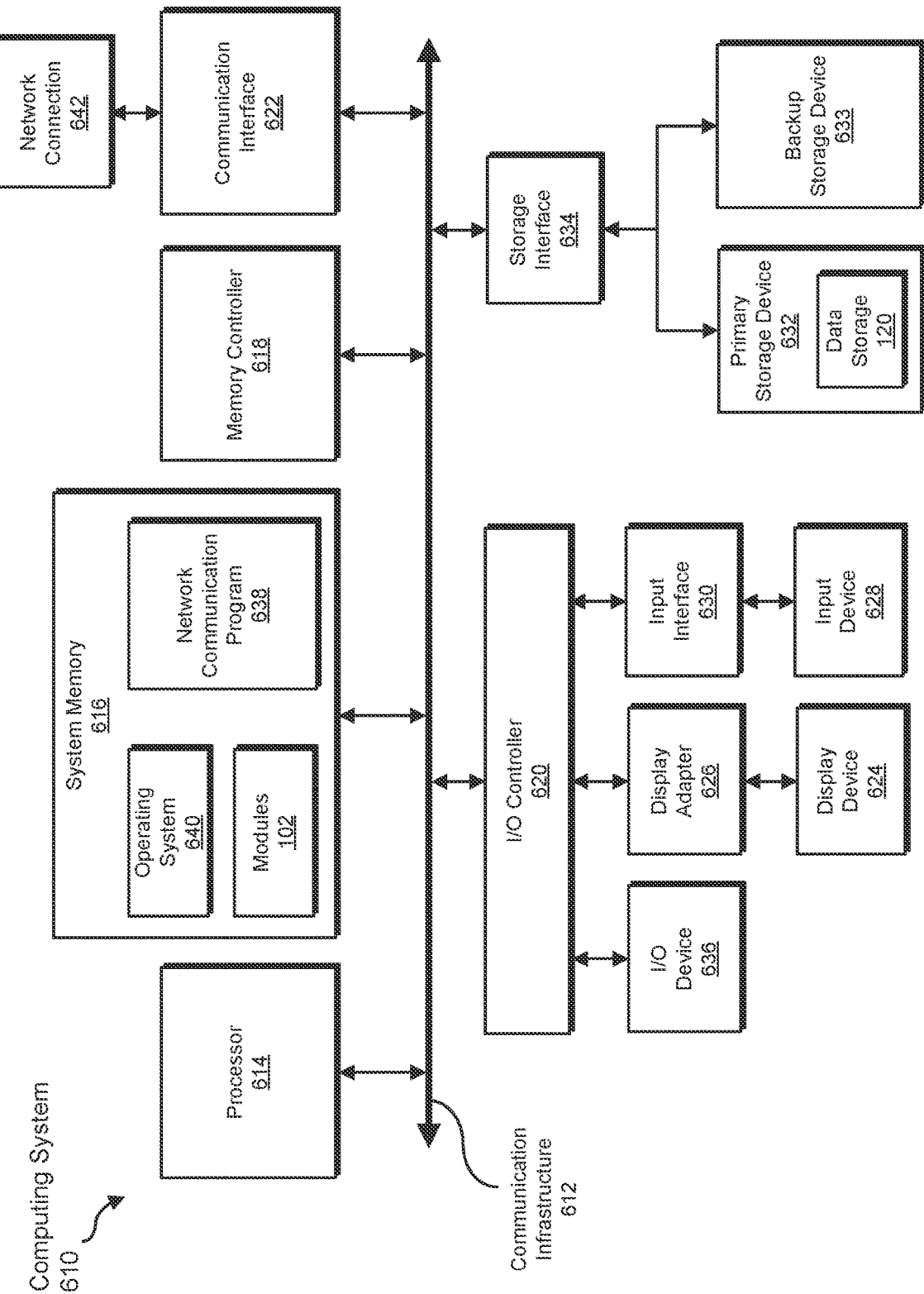
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, by either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
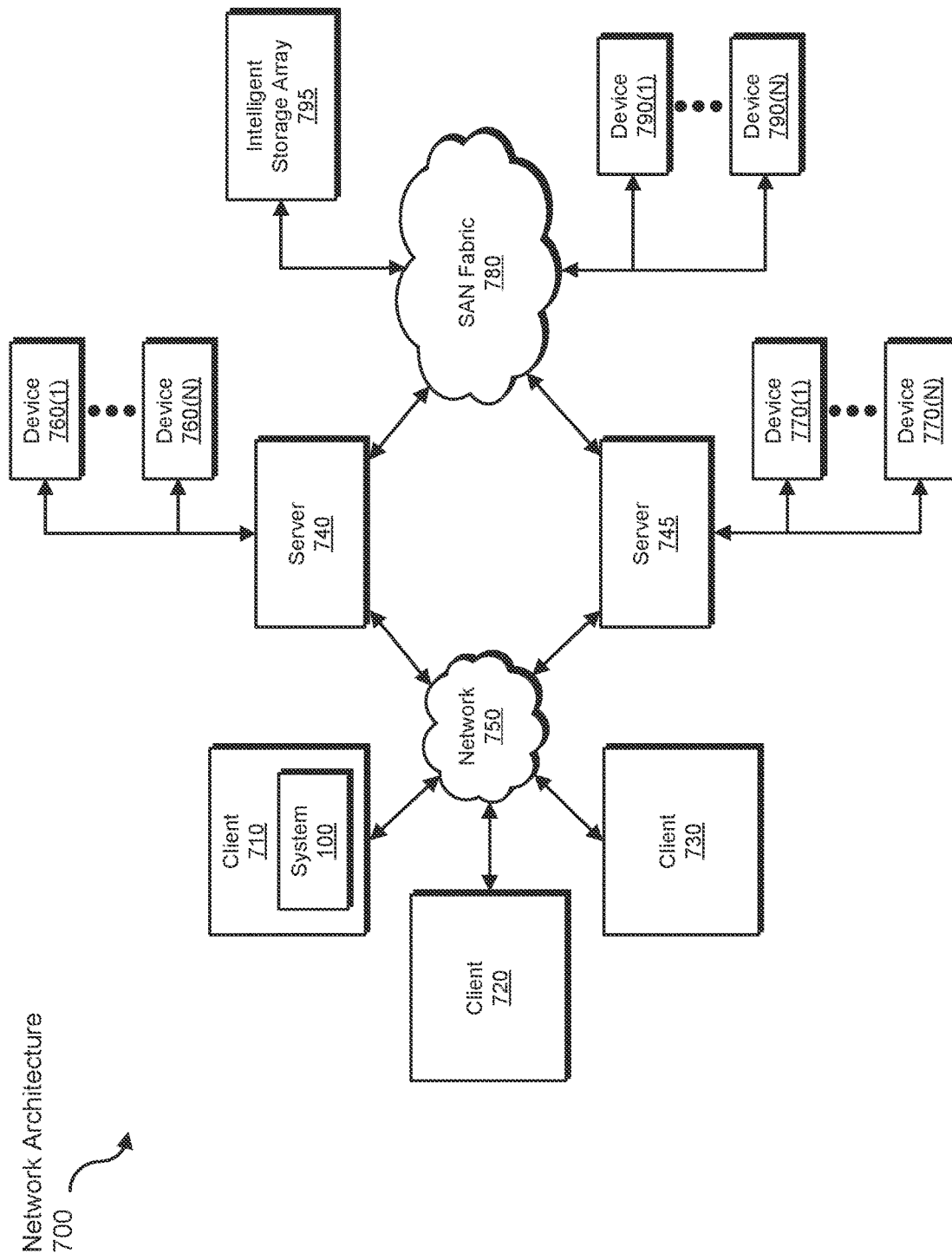
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, by either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, by either alone or in combination with other elements, one or more steps of an example method for identifying security threats in smart contract-based services to protect against malicious attacks utilizing off-blockchain resources.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying security threats in smart contract-based services to protect against malicious attacks utilizing off-blockchain resources, at least a portion of the method being performed by one or more computing devices comprising at least one processor, the method comprising:
    identifying a reference associated with a transaction on a smart contract-based platform;
    detecting, by the one or more computing devices, smart contract source code corresponding to one or more smart contracts associated with the reference on the platform;
    extracting, by the one or more computing devices, an identifier from the smart contract source code to locate off-blockchain resources utilized by a smart contract oracle included in the smart contract source code by:
        parsing the smart contract source code to identify an address utilized by the smart contract oracle to contact a domain associated with the off-blockchain resources;
        mapping the address to a domain contacted by the smart contract oracle; and
        extracting the domain;
    determining, by the one or more computing devices, potential security threats associated with the off-blockchain resources; and
    performing, by the one or more computing devices, a security action that protects against the potential security threats.

2. The computer-implemented method of claim 1, wherein identifying the reference associated with the transaction on the smart contract-based platform comprises:
    detecting a blockchain transaction on the platform;
    identifying a transaction destination associated with the blockchain transaction; and
    resolving the transaction destination into a blockchain address.

3. The computer-implemented method of claim 1, wherein detecting the smart contract source code corresponding to the one or more smart contracts associated with the reference on the platform comprises identifying the smart contract source code associated with the reference on the platform.

4. The computer-implemented method of claim 1, wherein extracting, from the smart contract source code, the identifier to locate the off-blockchain resources utilized by the smart contract oracle comprises:
  parsing the smart contract source code to identify a domain associated with the off-blockchain resources that is contacted by the smart contracts; and
  extracting the domain.

5. The computer-implemented method of claim 1, wherein determining the potential security threats associated with the off-blockchain resources comprises performing an evaluation to identify the potential security threats based on at least one domain associated with the off-blockchain resources.

6. The computer-implemented method of claim 5, wherein performing the evaluation to identify the potential security threats based on the at least one domain associated with the off-blockchain resources comprises evaluating one or more of:
  a reputation database for historical data associated with the domain;
  a web stack for implementing a website associated with the domain to identify at least one of previously known security vulnerabilities and data leakages;
  certificate registration data associated with the domain; or
  a domain name registry service to access domain name registration data for the domain.

7. The computer-implemented method of claim 6, further comprising calculating a risk score based on the evaluation.

8. The computer-implemented method of claim 1, wherein performing the security action comprises generating a notification identifying the potential security threats associated with the off-blockchain resources.

9. The computer-implemented method of claim 8, wherein the notification comprises a risk assessment based on one or more security vulnerabilities determined for an off-blockchain resource domain utilized by the smart contracts.

10. A system for identifying security threats in smart contract-based services to protect against malicious attacks utilizing off-blockchain resources, the system comprising:
  at least one physical processor;
  physical memory comprising computer-executable instructions and one or more modules that, when executed by the physical processor, cause the physical processor to:
    identify, by an identification module, a reference associated with a transaction on a smart contract-based platform;
    detect, by a detection module, smart contract source code corresponding to one or more smart contracts associated with the reference on the platform;
    extract, by an extraction module, an identifier from the smart contract source code to locate off-blockchain resources utilized by a smart contract oracle included in the smart contract source code by:
      parsing the smart contract source code to identify an address utilized by the smart contract oracle to contact a domain associated with the off-blockchain resources;
      mapping the address to a domain contacted by the smart contract oracle; and
      extracting the domain;
    determine, by a determining module, potential security threats associated with the off-blockchain resources; and
    perform, by a security module, a security action that protects against the potential security threats.

11. The system of claim 10, wherein the identification module identifies the reference associated with the transaction on the smart contract-based platform by:
  detecting a blockchain transaction on the platform;
  identifying a transaction destination associated with the blockchain transaction; and
  resolving the transaction destination into a blockchain address.

12. The system of claim 10, wherein the detection module detects the smart contract source code corresponding to the one or more smart contracts associated with the reference on the platform by identifying the smart contract source code associated with the reference on the platform.

13. The system of claim 10, wherein the extraction module extracts the identifier from the smart contract source code to locate the off-blockchain resources utilized by the smart contract oracle by:
  parsing the smart contract source code to identify a domain associated with the off-blockchain resources that is contacted by the smart contracts; and
  extracting the domain.

14. The system of claim 10, wherein the determining module determines the potential security threats associated with the off-blockchain resources comprises by performing an evaluation to identify the potential security threats based on at least one domain associated with the off-blockchain resources.

15. The system of claim 14, wherein the determining module performs the evaluation to identify the potential security threats based on the at least one domain associated with the off-blockchain resources by evaluating one or more of:
  a reputation database for historical data associated with the domain;
  a web stack for implementing a website associated with the domain to identify at least one of previously known security vulnerabilities and data leakages;
  certificate registration data associated with the domain; or
  a domain name registry service to access domain name registration data for the domain.

16. The system of claim 15, wherein the determining module further performs the evaluation to identify the potential security threats based on the at least one domain associated with the off-blockchain resources by calculating a risk score.

17. The system of claim 10, wherein the security module performs the security action by generating a notification identifying the potential security threats associated with the off-blockchain resources.

18. A non-transitory computer-readable medium comprising one or more computer-executable instructions that, when executed by at least one processor of a computing device, cause the computing device to:
  identify a reference associated with a transaction on a smart contract-based platform;
  detect smart contract source code corresponding to one or more smart contracts associated with the reference on the platform;
  extract an identifier from the smart contract source code to locate off-blockchain resources utilized by a smart contract oracle included in the smart contract source code by:

parsing the smart contract source code to identify an address utilized by the smart contract oracle to contact a domain associated with the off-blockchain resources;
mapping the address to a domain contacted by the smart contract oracle; and
extracting the domain;
determine potential security threats associated with the off-blockchain resources; and
perform a security action that protects against the potential security threats.

* * * * *